United States Patent [19]

Forstbauer et al.

[11] 4,367,522

[45] Jan. 4, 1983

[54] THREE-PHASE INVERTER ARRANGEMENT

[75] Inventors: Wilhelm Forstbauer, Erlangen; Hans-Peter Kroworsch, Heroldsbach; Herbert Küller, Baiersdorf; Jürgen Strop, Langensendelbach, all of Fed. Rep. of Germany

[73] Assignee: Siemens Aktiengesellschaft, Munich, Fed. Rep. of Germany

[21] Appl. No.: 245,592

[22] Filed: Mar. 19, 1981

[30] Foreign Application Priority Data

Mar. 28, 1980 [DE] Fed. Rep. of Germany ....... 3012232
Aug. 1, 1980 [DE] Fed. Rep. of Germany ....... 3029278

[51] Int. Cl.³ .......................................... H02M 7/515
[52] U.S. Cl. ...................................... 363/137; 363/71; 363/96
[58] Field of Search .................................. 363/71–72, 363/95, 96, 136–138

[56] References Cited

U.S. PATENT DOCUMENTS 3,050,674 8/1962 Moore ............................ 363/71 X
3,144,599 8/1964 Brahm ............................ 363/71 X
3,225,282 12/1965 Haas, Jr. ........................ 363/71
3,354,376 11/1967 Corey et al. .................... 363/95 X
3,718,853 2/1973 Graf ............................. 363/71 X Primary Examiner—William M. Shoop
Assistant Examiner—Peter S. Wong
Attorney, Agent, or Firm—Kenyon & Kenyon

[57] ABSTRACT

An inverter arrangement for generating a three-phase AC output voltage is provided with three pulse-controlled, free-running single-phase inverters. The inverters are connected at their inputs to a DC voltage source, and at their outputs to respective low-pass filters. The low-pass filters are connected to corresponding single-phase transformers, each having an output winding. The output windings of the single-phase transformers are connected to one another in a Y-circuit configuration to produce the output AC voltages, having a grounded neutral terminal. Each of the single-phase inverters is controlled by an associated pulse control device which contains a vector-oriented control device and a control unit. A vector oscillator generates signals corresponding to a symmetrical three-phase system of reference vectors for the vector-oriented control devices.

4 Claims, 11 Drawing Figures

THREE-PHASE INVERTER ARRANGEMENT

BACKGROUND OF THE INVENTION

This invention relates generally to systems for producing a three-phase AC output voltage, and more particularly, to an arrangement which utilizes three free-running inverters for generating three-phase AC voltages from a DC voltage supply.

It is known in the art that a three-phase AC system can be formed from three single-phase inverters. In such known inverter arrangements, the single-phase inverters utilize control pulses which are received from a clock generator having an output frequency which is three times the frequency of the desired output AC voltage, the pulses being counted so as to produce the appropriate output phase. Alternatively, an inverter arrangement having a three-phase output can be constructed using a three-phase bridge circuit. One such inverter arrangement is described in *Thyristor-Handbuch*, by Hoffman-Stocker, 1965, page 252. The arrangement described therein utilizes low-pass filters to reduce harmonic content (see FIG. 169 of Hoffmann-Stocker).

It is a problem with low-pass filters of the type used to reduce the harmonic content of the AC output voltage of known three-phase inverter systems, that the amplitude and phase characteristics of the filter vary as a function of the load. This problem is compounded by the fact that the series inductor of a low-pass filter must be large so as to provide adequate short-circuit resistance to the inverter, but such a large inductance increases the magnitude of the variations in phase and amplitude, in response to variations in the magnitude of the load. Thus, if the load of a three-phase system is unbalanced, the series inductance of the low-pass filters will cause the output phases of the system to be asymmetrical with respect to one another, in terms of amplitude and phase.

It is, therefore, an object of this invention to provide an inverter arrangement in which a three-phase symmetrical output AC voltage is insured even though the load is unbalanced.

SUMMARY OF THE INVENTION

The foregoing and other objects are achieved by this invention which provides an arrangement of three single-phase transformers, each having a first winding on the converter side, each such first winding being connected to an associated low-pass filter, and a second winding on the network side, the second windings being arranged in a Y-circuit configuration having a grounded neutral terminal so as to form the three-phase output AC voltage. The low-pass filters are each coupled to respectively associated single-phase inverter circuits which are each controlled by control pulses from an associated vector-oriented control device and a pulse control unit. The vector-oriented control devices receive corresponding vector control signals from a vector oscillator which generates a symmetrical three-phase system of reference vectors, and an output measurement signal which corresponds to the amplitude and phase of the associated AC output voltage. Thus, each pulse control unit receives from its associated vector-oriented control device amplitude and phase control signals which enable the associated pulse control unit to control its associated single-phase inverter circuit so as to insure that the associated AC output voltage corresponds in phase and amplitude to the information in the vector control signal.

In one embodiment of the inventive inverter arrangement, three independently controlled single-phase converters are each provided with a respectively associated pulse control unit, vector-oriented control device, low-pass filter, and single-phase transformer. The three-phase AC output voltage is formed by the interconnection of the secondary windings of the single-phase transformers in a Y-connection configuration. The three-phase voltage system according to the invention achieves symmetry by the operation of vector-oriented control devices which represent the output voltages of the three single-phase inverters separately in polar coordinates. This system is distinguishable from known three-phase voltage systems which control the individual output voltages by operation of circuitry which generates a symmetrical raster of pulses. In the present invention, each vector-oriented control device shifts the independent pulse raster produced by its associated single-phase inverter until its output voltage vector is in phase with a reference vector provided by the vector oscillator. Since the vector oscillator provides a symmetrical system of reference vectors, the output voltage system of the inverter arrangement has angular symmetry. The amplitudes of the three-phase output AC voltages are made symmetrical independently of one another by pulse modulation circuitry associated with each single-phase inverter. The phase controlled circuit and the amplitude control circuit of each single-phase inverter are decoupled from one another.

BRIEF DESCRIPTION OF THE DRAWINGS

Comprehension of the invention is facilitated by reading the following detailed description in conjunction with the annexed drawings, in which.

DETAILED DESCRIPTION

Figure 1:
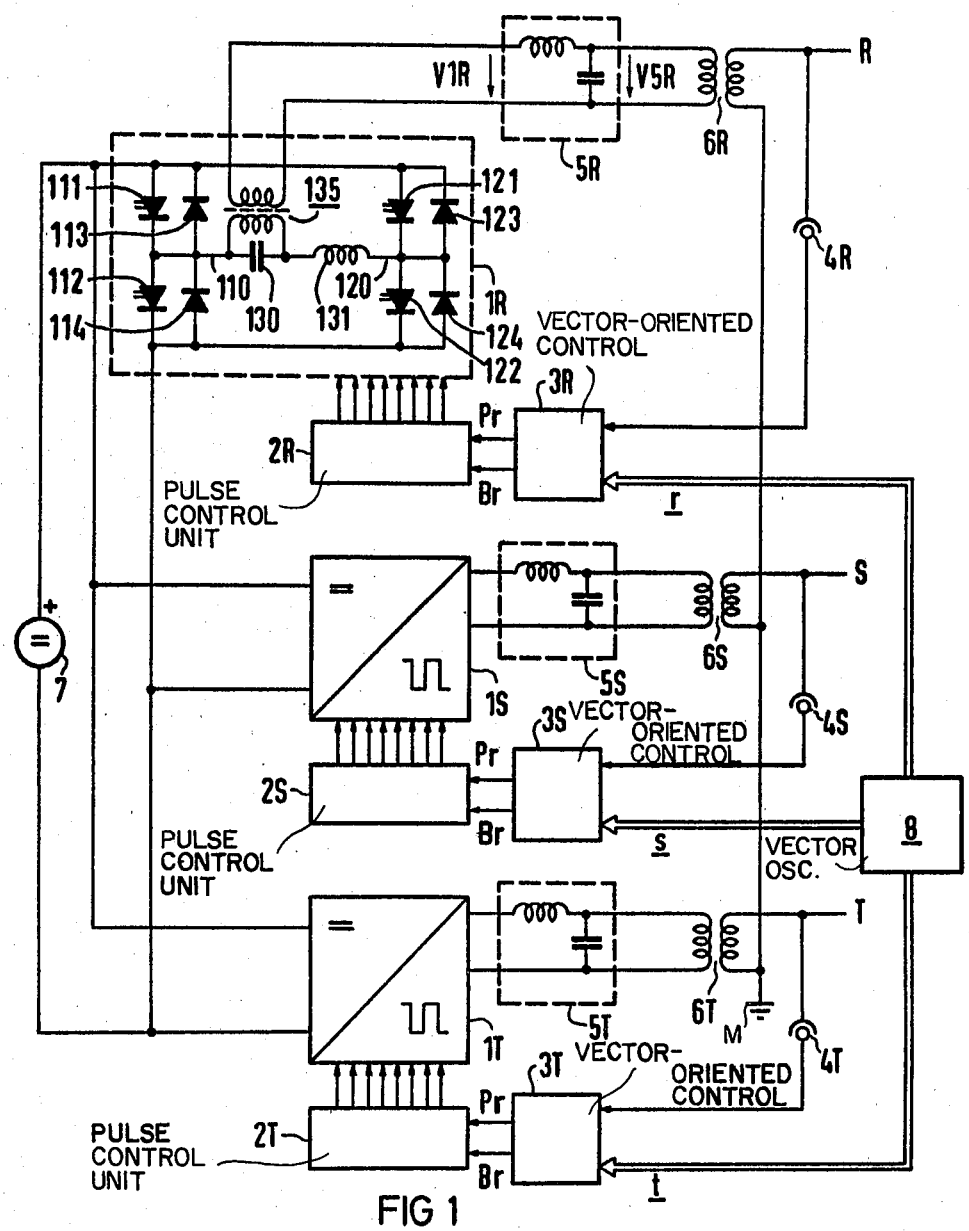
FIG. 1 is a representation, partly in schematic form and partly in block and line representation, of a three-phase inverter arrangement constructed in accordance with the principles of the invention.

FIG. 1 shows a three-phase inverter arrangement constructed in accordance with the principles of the invention having three single-phase, free-running inverters 1R, 1S, 1T. Since all of the single-phase inverters are identical to one another, the electrical components contained therein are shown schematically for only inverter 1R. Inverter 1R contains two electrical legs 110 and 120. Electrical leg 110 is provided with a pair of primary controlled electrical valves 111 and 112 which are shown in simplified form in the diagram as controlled rectifiers. Each such electrical valve is provided with an associated diode, 113 and 114, respectively, which is poled for conduction in a direction of current flow which is opposite to that of the electrical valve. Electrical valves 111 and 112 are of a type which can be fired and quenched. Electrical leg 120 is similarly provided with a pair of primary controlled electrical valves 121 and 122, and associated, oppositely poled diodes 123 and 124. A commutation circuit having a commutating capacitor 130 and a commutating inductance 131, is arranged between electrical legs 110 and 120. Commutating capacitor 130 is shunted by a converter-side winding of a coupling transformer 135. Since the details of the structure and operation of the inverter circuits are known in the art, the need for a detailed explanation thereof is obviated.

As shown in the figure, the three single-phase inverters 1R, 1S, 1T are connected in parallel to a DC voltage source 7. In some embodiments, and L-C filter circuit (not shown) may be provided. DC voltage source 7 may be illustratively provided in an on-board power supply, a battery, a frequency converter arrangement, or a DC current or DC voltage intermediate link which is supplied by a rectifier circuit.

Each of the single-inverters 1R, 1S, an 1T is coupled by the network-side winding of its coupling transformer to an associated one of low-pass filters 5R, 5S, and 5T. As shown in the drawing, the low-pass filters are illustrated in the form of an equivalent circuit having a series inductance and shunt capacitance. In practice, the low-pass filters are tuned to characteristic harmonics in the pulse-shaped output voltages of the single-phase inverters. Each of the low-pass filters is coupled at its input to the network-side winding of the coupling transformer in its associated single-phase inverter circuit, as previously indicated, and at its output to a first winding of an associated one of single-phase transformers 6R, 6S, and 6T. Single-phase transformers 6R, 6S, and 6T are coupled to one another at respective second windings so as to form a Y-circuit configuration. The neutral point M of the Y-circuit configuration is connected to a reference potential, illustratively ground. The three-phase output AC voltage is obtained at terminals R, S, and T. It is a feature of this transformer coupling arrangement that the output voltages of the inverters are matched to the desired voltage level of the three-phase network, and the three-phase network is DC decoupled form DC voltage source 7.

As previously noted, each single-phase inverter 1R, 1S, and 1T is controlled by an associated one of pulse control units 2R, 2S, and 2T, in combination with a series-connected one of vector-oriented control devices 3R, 3S, and 3T. The vector-oriented control devices each form an amplitude control voltage which is conducted to an amplitude control input Br of the associated pulse control unit. In addition, a phase control voltage is conducted to a phase control input Pr of the associated control unit. Since the vector-oriented control devices 3R, 3S, and 3T operate independently of one another, the output voltage of each single-phase converter can be individually set in polar coordinates, without concern for the amplitude and phase of the voltage from each of the other single-phase converters. Control units 2R, 2S, and 2T generate control firing pulses which govern the conduction state of the control electrical valves in the associated single-phase inverters. The corresponding connections between each pulse control unit and its associated single-phase converter are represented in the figure by arrows emanating from the pulse control units.

If a load is coupled to the inverter arrangement, the series reactance of the low-pass filters causes a vectorial voltage change. If the load is unbalanced, different vectorial voltage changes are produced in the individual phases of the three-phase system. Symmetry is achieved and maintained by operation of the vector-oriented control devices 3R, 3S, and 3T, which keep the vector of each phase voltage R, S, and T in agreement with the reference vectors r, s, and t, which are generated by vector oscillator 8 as a three-phase symmetrical system. The reference vectors r, s, and t are conducted to respective reference inputs of vector-oriented control devices 3R, 3S, and 3T. The vector-oriented control devices receive at further inputs, respective output measurement signals which correspond in phase and amplitude to respective ones of the AC output voltages at terminals R, S, and T. The three-phase output terminals R, S, and T are coupled to their respective vector-oriented control devices by associated ones of measuring transformers 4R, 4S, and 4T. For purposes of discussion, it will be assumed hereinbelow that single-phase transformers 6R, 6S, and 6T have no reactance of their own, or alternatively, the reactance of the single-phase transformers is included in the low-pass filters. Accordingly, it will be assumed that voltage measuring transformers 4R, 4S, and 4T measure the respective filter output voltages.

Figure 2:
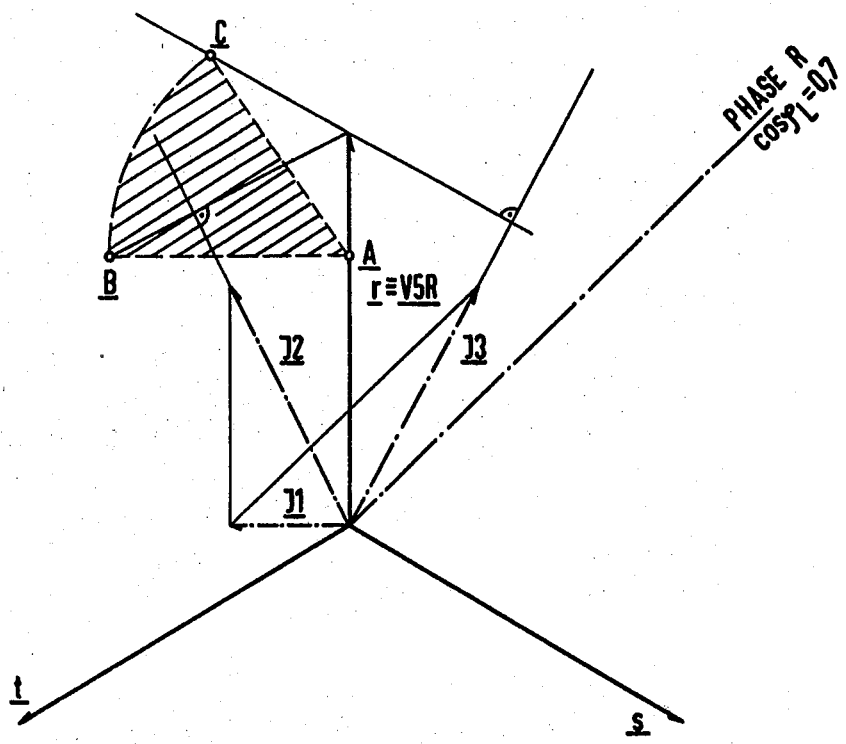
FIG. 2 is a vector diagram of the currents and voltages in a single-phase inverter, under different load conditions.

FIG. 2 is a vector diagram which is useful in explaining the manner in which a single-phase inverter, illustratively inverter 1R, is controlled with respect to symmetrical reference vectors r, s, and t.

During times when no load is provided at the AC output voltage terminals, single-phase inverter 1R produces a current J1 which leads a filter output voltage $V_{5R}$ of low-pass filter of 5R. Current J1 is produced as a result of the shunt capacity of low-pass filter 5R. As shown in FIG. 2, an output voltage $V_{1R}$ ends at a point A, as a result of a voltage drop in the series reactance of the low-pass filter.

When a purely resistive load is coupled to the inverter system, a current J2 is generated. The vector of the inverter of the output voltage now ends at a point B.

When a resistive-inductive load, having a load angle cos $\phi = 0.7$, is applied to the inverter arrangement, inverter R is loaded with a current vector J3. The vector of the inverter output voltage ends at a point C. Thus, the points A, B, and C define a locus area within which vector $V_{1R}$, which corresponds to the output voltage of single-phase inverter R, moves for the given load limits of cos $\phi = 1$ to cos $\phi = 0.7$. Thus, vector $V_{1R}$ must remain within the locus area defined by points A, B, and C, if low-pass filter output voltage vector $V_{5R}$ is to correspond with reference vector r.

Figure 3:
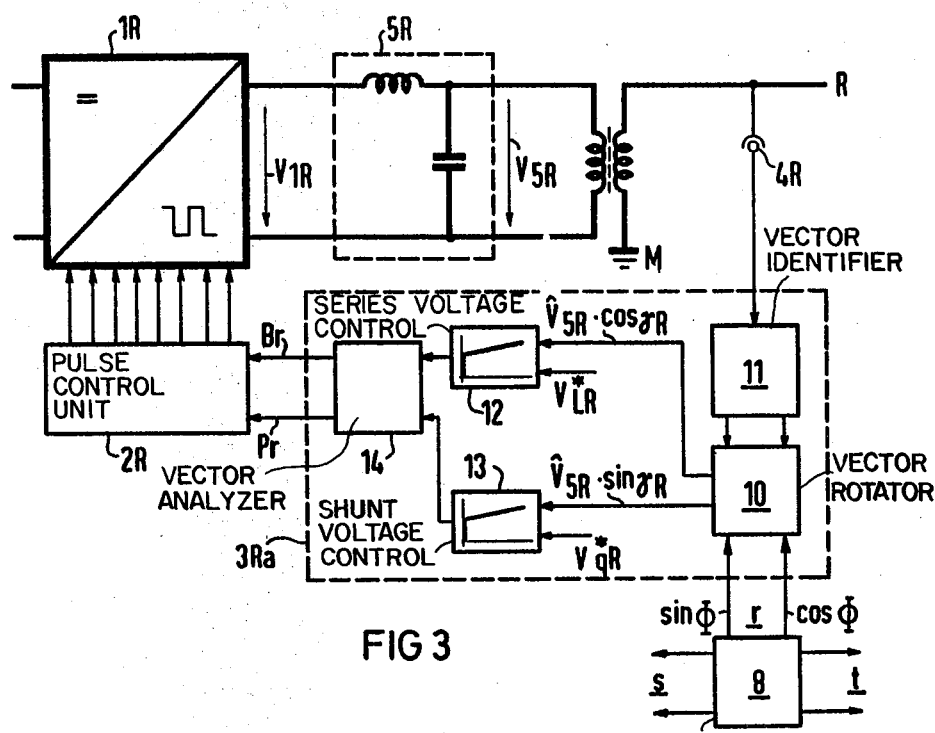
FIG. 3 is a block and line representation of a specific illustrative embodiment of a vector-oriented control device which operates in Cartesian coordinates.

FIG. 3 is a block and line representation of an illustrative vector-oriented control device 3Ra, which controls the position of vector $V_{1R}$, corresponding to the output voltage of single-phase inverter 1R. In this embodiment, vector $V_{1R}$ is controlled in terms of Cartesian coordinates. In operation, vector oscillator 8 generates, from a clock having a frequency f, reference vectors r, s, and t. Such reference vectors are produced in terms at their respective sine and cosine components. A pair of angle components, $\sin \phi$ and $\cos \phi$, of reference vector r, are conducted to a vector rotator 10, and rotated by a fictitious phase deviation $\gamma_R$ of the vector of the filter output voltage of phase R, from the position at reference vector r. If the measured voltage value is considered to be $\hat{V}_{5R} \cos (\rho \pm \gamma_R)$, the vector identifier 11 forms a variable orthogonal thereto $\hat{V}_{5R} \sin (\rho \pm \gamma_R)$. Demodulation of the AC voltage variables is performed in vector rotator 10 by projecting the angle components of the load voltage onto the angle components at reference vector r, and the DC variables $\hat{V}_{5R} \cos \gamma_R$ and $\hat{V}_{5R} \sin \gamma_R$ are formed as representative actual values. The DC voltage variable $\hat{V}_{5R} \cos \gamma_R$ is the series voltage caused by the fictitious phase deviation of the load voltage vector from reference vector r; and the DC voltage variable $\hat{V}_{5R} \sin \gamma_R$ is the corresponding shunt voltage.

DC voltage variable $\hat{V}_{5R} \cos \gamma_R$ is conducted to a series voltage controller 12, and DC voltage variable $\hat{V}_{5R} \sin \gamma_R$ is conducted to a shunt voltage controller 13. These values represent controlled variables. Series voltage controller 12 receives at a control input a constant voltage amplitude $V^*_{LR}$. Similarly, shunt voltage controller 13 receives a voltage amplitude $V^*_{qR}=0$ at its control input.

Series and shunt voltage controllers 12 and 13, provide at their outputs signals which represent variables in Cartesian coordinates. These signals are conducted to a vector analyzer 14 where they are converted into polar coordinates variables. The amplitude variable in the form of an amplitude control signal is conducted to amplitude control input Br of pulse control unit 2R, and the angular variable in the form of a phase control signal is conducted to phase control input Pr. The amplitude control signal determines the amplitude of the load voltage, and the phase control signal determines the phase angle between the low-pass filter output voltage $V_{5R}$ and voltage $V_{1R}$ at the output of single-phase inverter 1R.

Figure 4:
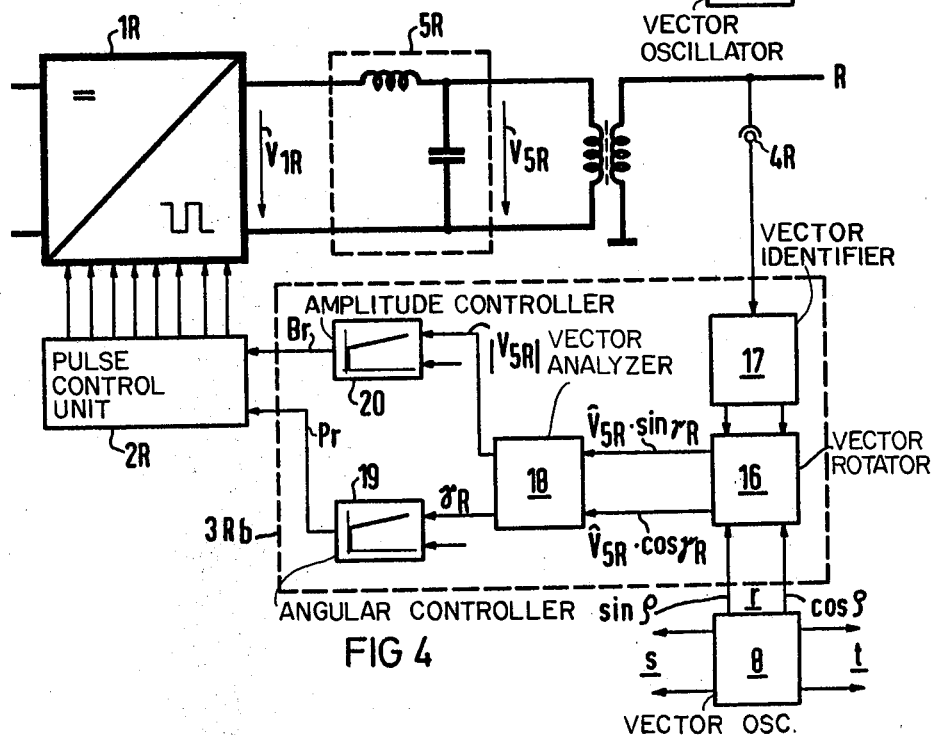
FIG. 4 is a block and line representation of a specific illustrative embodiment of a vector-oriented control device which operates in polar coordinates.

FIG. 4 is a block and line representation of an illustrative vector-oriented control device 3Rb which controls the position of vector $V_{1R}$, in terms of polar coordinates. Angle components $\sin \rho$ and $\cos \rho$ of reference vector r are formed in vector oscillator 8, and conducted to a vector rotator 16 which may be electrically identical to vector rotator 10, in FIG. 3. The filter output voltage at terminal R is converted into a measurement signal, by measuring transformer 4R, which is conducted to a vector identifier 17. Vector identifier 17 may be electrically identical to vector identifier 11 in FIG. 3. Vector identifier 16 demodulates the AC voltage variables by projecting angle components $\hat{V}_{5R} \sin (\rho \pm \gamma_R)$ and $\hat{V}_{5R} \cos (\rho \pm \gamma_R)$ of the low-pass filter output voltage onto the angle components $\sin \rho$ and $\cos \rho$ of reference vector r. DC voltage variables $\hat{V}_{5R} \cos \gamma_R$ and $\hat{V}_{5R} \sin \gamma_R$ are formed as representative actual values. These two DC voltage variables are formed in terms of Cartesian coordinates, and are converted into polar coordinates by a vector analyzer 18, which will be described below with reference to FIGS. 7, 8, and 9, into polar variables $|V_{5R}|$ and $\gamma_R$. The amplitude variable $|V_{5R}|$ is conducted to an amplitude controller 20, and the angular variable $\gamma_R$ is conducted to an angular controller 19. Amplitude controller 20 receives a constant voltage value at a control input, while angular controller 19 receives a voltage value for $\gamma_R^*=0$. The outputs of amplitude controller 20 and angular controller 19 are conducted to amplitude and phase control inputs, Br and Pr, respectively, at pulse control unit 2R, and operate in the manner described above.

Figure 5:
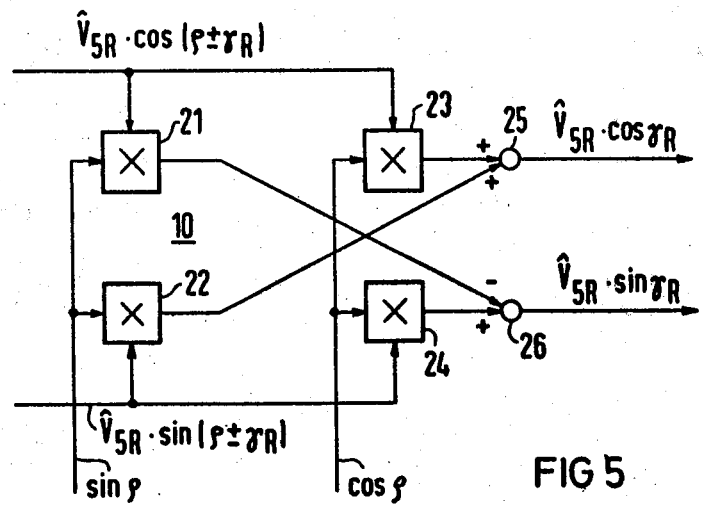
FIG. 5 is an illustrative embodiment of a vector rotator circuit.

FIG. 5 is a block and line diagram of a basic design of vector rotator 10, in FIG. 3. Vector rotator 10 contains four multipliers 21, 22, 23, and 24, a summing amplifier 25 which operates as an adder, and a summing amplifier 26 which operates as a subtractor. Multiplier 21 receives at a first input the angle component $\hat{V}_{5R} \cos (\rho \pm \gamma_R)$ of the low-pass filter output voltage, and at a second input, the angle component $\sin \rho$ of reference vector r. Multiplier 22 receives at its first input the angle component $\hat{V}_{5R} \sin (\rho \pm \gamma_R)$ of the output voltage of the low-pass filter, and at a second input, the angle component $\sin \rho$ of reference vector r. Multiplier 23 receives at a first input the angle component $\hat{V}_{5R} \cos (\rho \pm \gamma_R)$ of the low-pass filter output voltage, and the angle component $\cos \rho$ of the reference vector, at its second input. Multiplier 24 receives the angle components $\hat{V}_{5R} \sin (\rho \pm \gamma_R)$ of the low-pass filter output voltage, and the angle component $\cos \rho$ of the reference vector, at its second input. The output voltages of multipliers 22 and 23 are added in summing amplifier 25 to form the angle component $\hat{V}_{5R} \cos \rho_R$ rotated by the angle $\rho$. The output signal of multiplier 21 is subtracted from the output signal of multiplier 24 in subtractor 26 to form the component $V_{5R} \sin \gamma_R$ rotated by the angle $\rho$.

Figure 6:
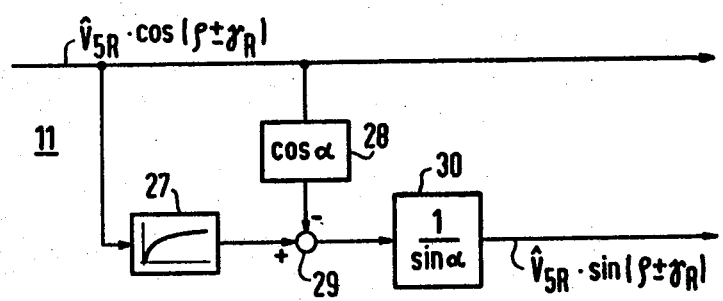
FIG. 6 is an illustrative embodiment of a vector identifier circuit.

FIG. 6 is a block and line representation of a basic design of vector identifier 11, in FIG. 3. Input variable $\hat{V}_{5R} \cos (\rho \pm \gamma_R)$ is conducted by a first-order delay line 27 to a noninverting input of subtractor 29. An amplifier 28 further weights the input voltage $\hat{V}_{5R} \cos (\rho \pm \gamma_R)$ by a factor $\cos \alpha$. The output signal of amplifier 28 is conducted to an inverting input of subtractor 29. The output signal of subtractor 29 is conducted to an input of an amplifier 30 which is provided with a factor $1/\sin \alpha$. Amplifier 30 provides at its output a desired sine component $\hat{V}_{5R} \sin (\rho \pm \gamma_R)$ for the cosine component $\hat{V}_{5R} \cos (\rho \pm \gamma_R)$ at its input.

Figure 7:
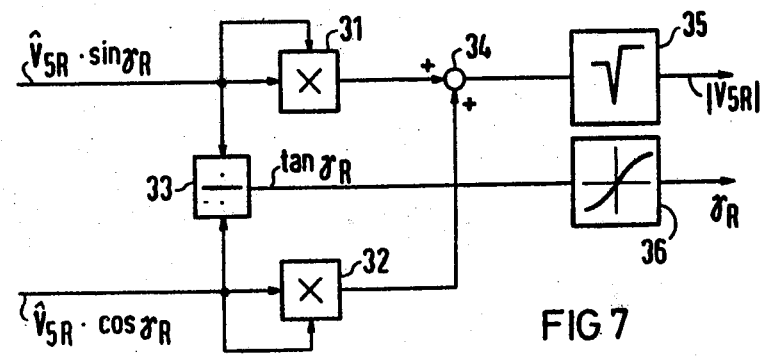
FIG. 7 is a first illustrative embodiment of a vector analyzer circuit.

FIG. 7 is a block and line representation of a basic circuit arrangement for vector analyzer 18 in vector-oriented control device 3Rb of FIG. 4. Vector analyzer 18 is provided with two multipliers, 31 and 32, which are connected as squarers, a divider 33, a summing amplifier 34, a radix former 35, and a function generator 36 for simulating an arctangent function. Angle component $\hat{V}_{5R} \sin \gamma_R$ is conducted to a dividend input of divider 33, and is squared in multiplier 31. Angle component $\hat{V}_{5R} \cos \gamma_R$ is conducted to a divisor input of divider 33, and is squared in multiplier 32. The output voltage of divider 33 corresponds to the tangent of the angle $\gamma_R$ (i.e. $\tan \gamma_R$) which is converted by function generator 36 into angle $\gamma_R$ by operation of its arctangent function. The output signals from multipliers 31 and 32 are added in summing amplifier 34, the output signal of which represents the sum of the squares of the angle components at the inputs to the multipliers. Radix former 35 produces the absolute amount of $|V_{5R}|$.

Figure 8:
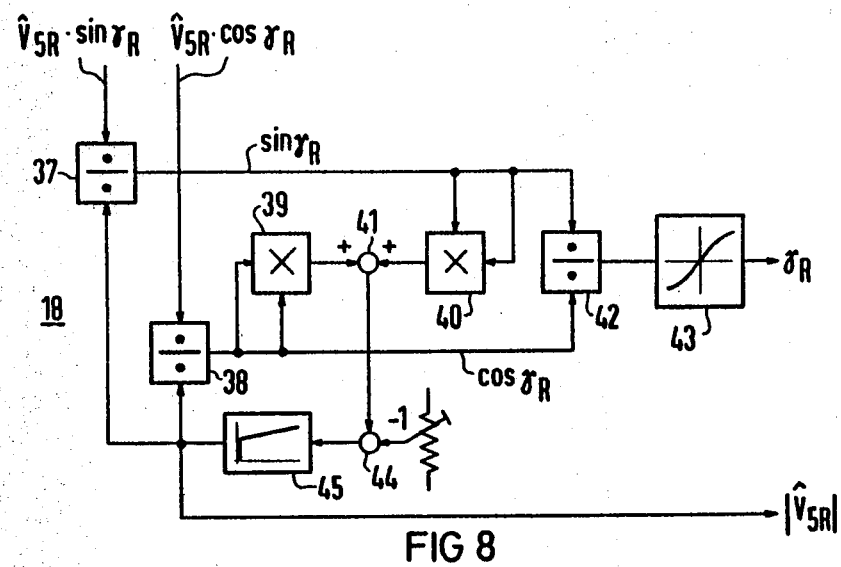
FIG. 8 is a second illustrative embodiment of a vector analyzer circuit.

FIG. 8 is a block and line representation of a basic circuit design of another embodiment of vector analyzer 18 in FIG. 4. The vector analyzer in this figure is provided with dividers 37, 38, and 42, multipliers 39 and 40 connected as squarers, summing amplifiers 41 and 42, a pi-controller 45, and a function generator 43 which simulates the arctangent function. Angle component $\hat{V}_{5R} \sin \gamma_R$ is conducted to a dividend input of divider 37. Divider 37 receives at a divisor input a signal which corresponds to the amplitude $|V_{5R}|$ of the low-pass filter output voltage. The output voltage of divider 37 corresponds to $\sin \gamma_R$. Angle component $\hat{V}_{5R} \cos \gamma_R$ is conducted to a dividend input of divider 38, the divisor input of which is also addressed by the amplitude $|V_{5R}|$ of the low-pass filter output voltage. Divider 38 produces at its output a voltage corresponding to $\cos \gamma_R$. The output voltage of divider 37 is conducted to a dividend input of divider 42 which receives at a divisor input the output signal of divider 38. Divider 42 produces at its output a signal which represents $\tan \gamma_R$, which is conducted to function generator 33 where it is converted into angle $\gamma_R$ by means of the arctangent function. Multipliers 39 and 40 are coupled at their outputs to respective inputs of summing amplifier 41 which produces at its output the sum of the squares of the angle components $\sin \gamma_R$ and $\cos \gamma_R$. A voltage corresponding in value to minus 1 is subtracted from the output of summing amplifier 41 by operation of summing amplifier 44. The output voltage of summing amplifier 44 is conducted to pi-controller 45, the output of which corresponds to the amplitude $|V_{5R}|$ of the low-pass filter output voltage.

Figure 9:
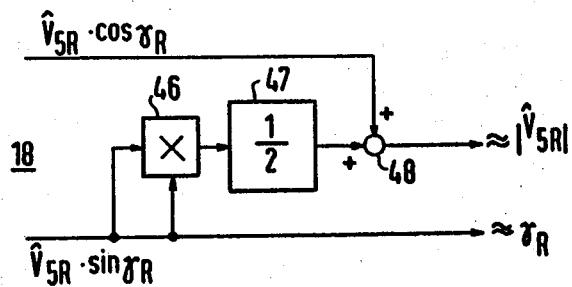
FIG. 9 is an illustrative embodiment of a simplified vector analyzer circuit.

FIG. 9 is a block and line representation of a simplified embodiment of vector analyzer 18 which will produce sufficiently accurate approximate values under the assumption that the reference value for the angle is $\gamma_R^* = 0$, and that the reference value for the amplitude of the low-pass filter output voltage is constant. In this simplified embodiment of the vector analyzer, a multiplier 46 is connected as a squarer which is coupled at its output to a proportional amplifier 47 which is subsequently coupled at its output to an input of a summing amplifier 48. Multiplier 46 produces at its output a signal corresponding to the square of the angle component $\hat{V}_{5R} \sin \gamma_R$, which is weighted in proportional amplifier 47 by the factor ½. The output voltage of proportional amplifier 47 is added in summing amplifier 48 to the other angle component $\hat{V}_{5R} \cos \gamma_R$ of the low-pass filter output voltage. The output voltage of summing amplifier 48 corresponds to an approximation value for the amplitude $|V_{5R}|$. The angle component $\hat{V}_{5R} \sin \gamma_R$ of the low-pass filter output voltage is directly used as the approximation value for $\gamma_R$.

Figure 10:
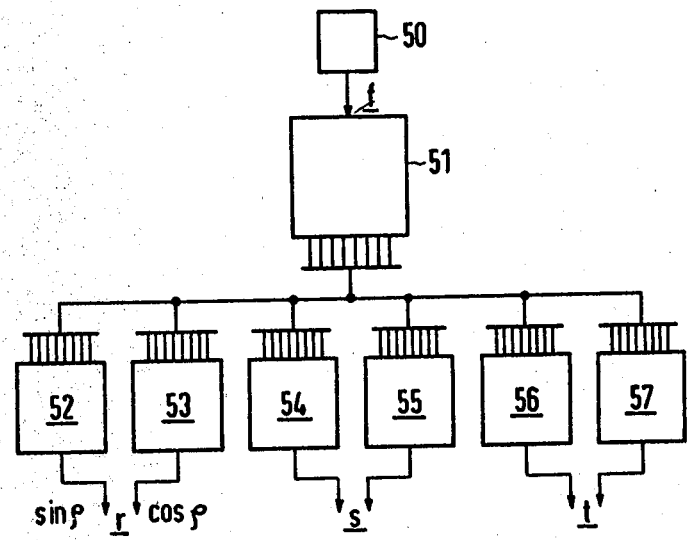
FIG. 10 is an illustrative embodiment of a vector oscillator circuit for generating a three-phase system of reference vectors.

FIG. 10 is a block and line representation of a digital vector oscillator 8. Vector oscillator 8 contains a counter 51 which is driven by a clock generator 50 having a clock frequency f. The count in counter 51 serves to continuously address a number of read-only memories (ROM) 52 to 57 which store the angle functions for the reference vectors r, s, and t. Further processing of the angle functions can be performed either in digital form, or in analog form by means of digital to analog converters. The circuitry contained in such a vector oscillator can be simplified by assuming correspondence of the values of the angle functions in certain ranges.

It is to be remembered that, although the inventive concept disclosed herein is described in terms of specific embodiments and particular applications, persons skilled in the pertinent art can generate additional embodiments without departing from the spirit or exceeding the scope of the invention. The block, line, and schematic illustrations, and the descriptions thereof, are merely illustrative of the principles of the invention, and should not be construed to limit the scope thereof.

Figure 11:
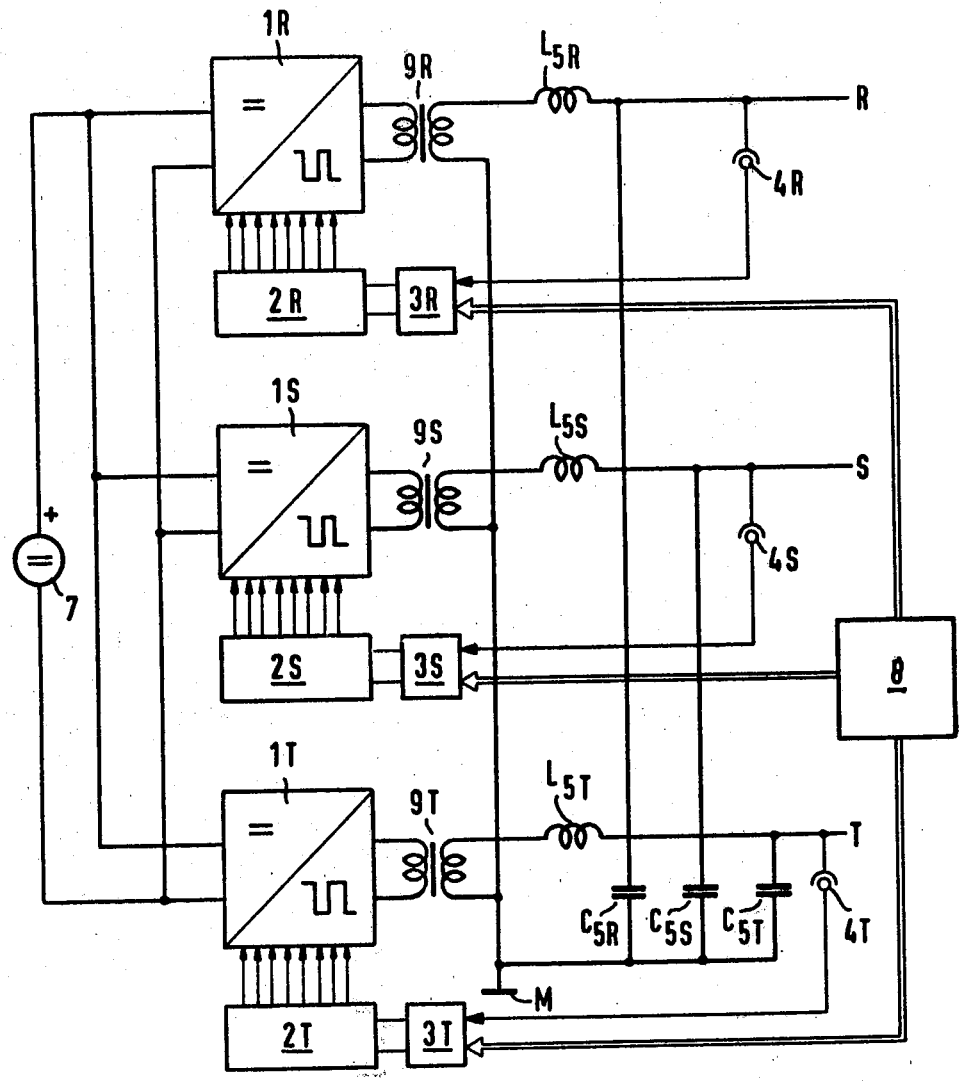
FIG. 11 is an other representation of the invention.

FIG. 11 is a representation of an inverter arrangement in which the single-phase inverters 1R, 1S, 1T are connected on the output side with the inverter-side windings of a transformer arrangement. The low-pass filters are arranged on the network side. The low-pass filter for the phase R contains the inductance $L_{5R}$ and the capacitance $C_{5R}$. There is provided a low-pass filter with $L_{5S}$, $C_{5S}$ for the phase S, and a low-pass filter with $L_{5T}$, $C_{5T}$ for the phase T. In this embodiment the transformer arrangement is not supplied from a symmetrical voltage system in the case of an unbalanced load. The pulse-shaped inverter output voltages are applied to the transformer arrangement so that additional core and copper losses occur on account of harmonics. Corresponding rating of leakage inductance of the transformer arrangement facilitates replacing the respective inductance required for a low-pass filter totally or at least partially by the leakage inductance of the transformer arrangement.

The transformer arrangement represented in FIG. 11 comprises three single-phase transformers 9R, 9S, 9T, whose network-side windings are in Y connection and grounded on the neutral point side. It is, however, also possible to use a three-phase transformer with a five-limb core.

Formation of the amplitude control voltages and phase control voltages for the single-phase inverter is effected as described above.

What is claimed is:

1. An inverter arrangement for generating a three-phase AC output voltage of the type having three single-phase inverters, each single-phase inverter being connected at an input to a DC voltage source, and at an output to a transformer arrangement by at least one low-pass filter, the arrangement further comprising:
    first, second, and third single-phase transformers in the transformer arrangement, each of said single-phase transformers having a converter-side winding connected to the low-pass filter, and a network-side winding, said network-side windings of said first, second, and third single-phase transformers being connected to one another in a Y-circuit configuration having a neutral terminal, said neutral terminal being connected to a reference potential;
    first, second, and third phase control means for controlling respective ones of the single-phase inverters, each of said first, second, and third phase control means having a vector-oriented control device coupled to an associated pulse control unit, said pulse control unit having at least one output for providing control pulses;
    vector oscillator means for generating a plurality of reference signals corresponding to a symmetrical three-phase system of reference vectors; and
    first and second input means in each of said vector-oriented control devices, said first input means being adapted to receive a corresponding one of said reference signals of said vector oscillator means, and said second input means being adapted for receiving a measurement signal corresponding in phase to a predetermined one of the three-phase AC output voltages.

2. The inverter arrangement of claim 1 wherein there is further provided:
    vector identifier means for determining angle components of a vector in said measurement signal;
    vector rotator means for generating a series voltage control signal and a shunt voltage control signal in response to said angle components determined by said vector indentifier and a corresponding one of said reference signals from said vector oscillator means; and vector analyzer means for generating an amplitude control signal and a phase control signal in response to said series voltage control signal and said shunt voltage control signal.

3. The inverter arrangement of claim 1 wherein said vector-oriented control device is further provided with:

vector identifier means for determining angle components of a vector in said measurement signal;

vector rotator means for generating DC voltage variables in the form of Cartesian coordinates in response to angle components determined by said vector identifier means and a corresponding one of said reference signals of said vector oscillator means; and vector analyzer means for converting said voltage variables from said Cartesian coordinates into polar coordinates so as to produce an amplitude control signal and a phase control signal.

4. An inverter arrangement for generating a three-phase AC output voltage of the type having first, second and third single-phase inverters, each single-phase inverter being connected at an input to a DC voltage source, and at an output to a transformer arrangement, the arrangement further comprising:

first, second, and third single-phase transformers in the transformer arrangement, and first, second and third low-pass filters, corresponding to the single-phase inverters, each of said single-phase transformers having a converter-side winding connected to the output of the corresponding single-phase inverter, and a network-side winding, said network-side windings of said first, second, and third single-phase transformers being connected to one another in a Y-circuit configuration having a neutral terminal, said neutral terminal being connected to a reference potential; and said first, second and third low-pass filters being arranged on the converter-side winding of said corresponding transformers;

first, second, and third phase control means for controlling respective ones of the single-phase inverters, each of said first, second, and third phase control means having a vector-oriented control device coupled to an associated pulse control unit, said pulse control unit having at least one output for providing control pulses;

vector oscillator means for generating a plurality of reference signals corresponding to a symmetrical three-phase system of reference vectors; and first and second input means in each of said vector-oriented control devices, said first input means being adapted to receive a corresponding one of said reference signals of said vector oscillator means, and said second input means being adapted for receiving a measurement signal corresponding in phase to a pre-determined one of the three-phase AC output voltages.

* * * * *